US006649879B1

United States Patent
Kohlstrung

(10) Patent No.: US 6,649,879 B1
(45) Date of Patent: Nov. 18, 2003

(54) METHOD AND DEVICE FOR HOMOGENIZING THE ENERGY SUPPLY TO PRODUCTS TO BE COOKED

(75) Inventor: Peter Kohlstrung, Kaufering (DE)

(73) Assignee: Rational Aktiengesellschaft, Landberg a. Lech (DE)

( * ) Notice: Subject to any disclaimer, the term of this patent is extended or adjusted under 35 U.S.C. 154(b) by 47 days.

(21) Appl. No.: 10/088,431

(22) PCT Filed: Jul. 19, 2000

(86) PCT No.: PCT/DE00/02087
§ 371 (c)(1),
(2), (4) Date: Mar. 15, 2002

(87) PCT Pub. No.: WO01/19193
PCT Pub. Date: Mar. 22, 2001

(30) Foreign Application Priority Data

Sep. 15, 1999 (DE) .......................................... 199 44 265

(51) Int. Cl.⁷ .............................. A21B 1/26; F24C 15/32
(52) U.S. Cl. ........................ 219/400; 126/21 A; 34/218
(58) Field of Search ....................... 219/400; 126/21 A; 34/218–233; 99/476

(56) References Cited

U.S. PATENT DOCUMENTS

| 4,142,004 A | * | 2/1979 | Hauser et al. ............... 438/792 |
| 4,308,853 A | | 1/1982 | Thirode |
| 4,537,118 A | | 8/1985 | Lind |
| 6,146,469 A | * | 11/2000 | Toshima ...................... 134/37 |

FOREIGN PATENT DOCUMENTS

| DE | 1 206 824 | 12/1965 |
| DE | 27 09 068 | 9/1978 |
| FR | 1435706 | 9/1966 |
| FR | 2 449 250 | 9/1980 |
| GB | 912162 | 12/1962 |

* cited by examiner

Primary Examiner—Joseph Pelham
(74) Attorney, Agent, or Firm—Schiff Hardin & Waite

(57) ABSTRACT

A method and apparatus for homogenizing the energy being supplied to products being cooked. The product is cooked in a cooking chamber of the apparatus on at least one receptacle or container, such as a baking tray or grill. The cooking chamber atmosphere is conducted over the container essentially along a plurality of flow paths which extend essentially parallel in relation to one another and the direction of the flow paths is periodically reversed so as to obtain a uniform heating of the products being cooked.

14 Claims, 1 Drawing Sheet

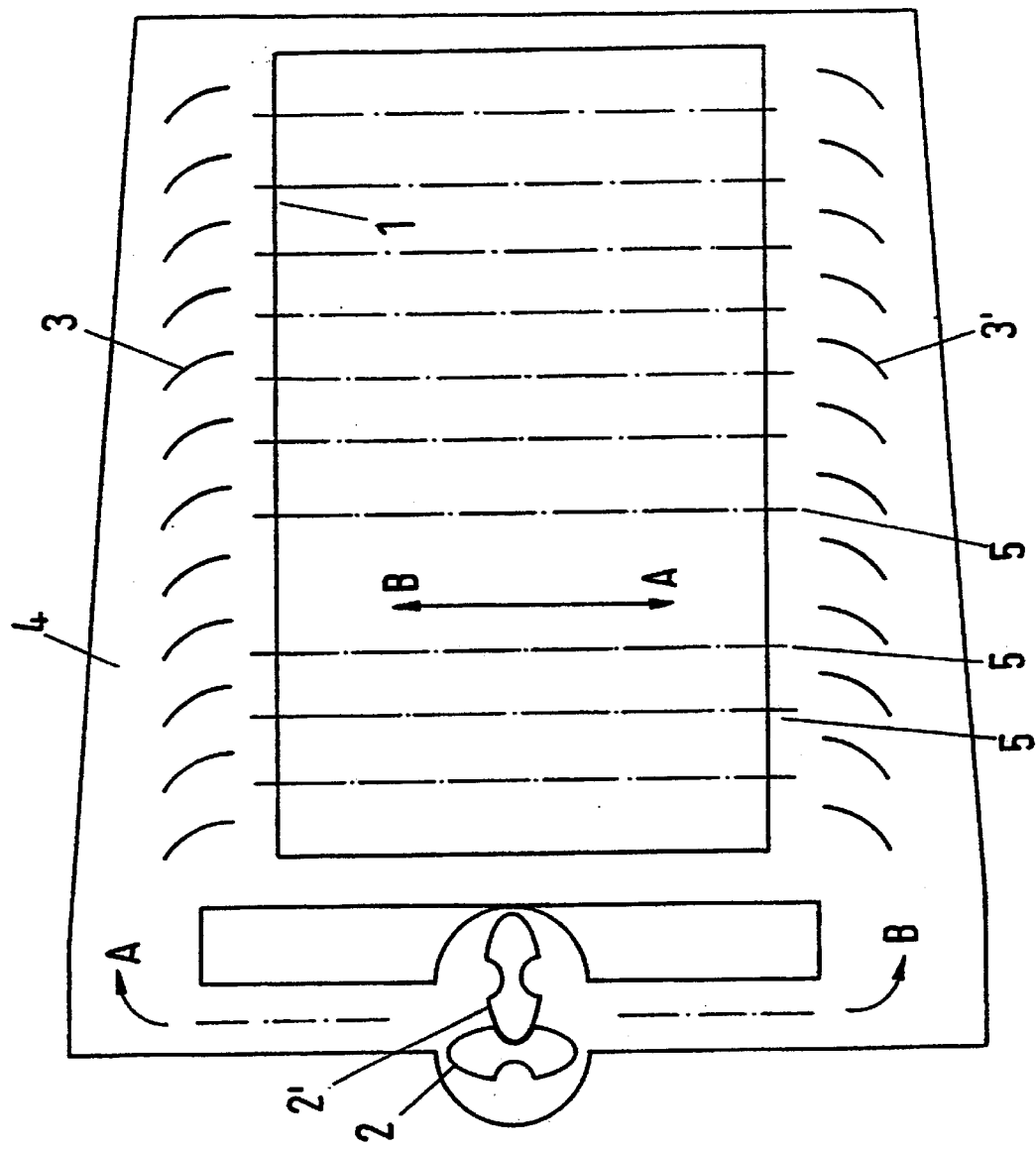

METHOD AND DEVICE FOR HOMOGENIZING THE ENERGY SUPPLY TO PRODUCTS TO BE COOKED

BACKGROUND OF THE INVENTION

The invention is directed to a method for homogenizing the introduction of energy into goods which are to be cooked and which are cooked on at least one container or receptacle such as a baking sheet, a grate or the like in a cooking chamber of a cooking apparatus by conducting the cooking chamber atmosphere over the container, particularly over the narrow or small side thereof, essentially exclusively along a plurality of flow paths proceeding essentially parallel to one another and by periodically reversing the blowing direction. The invention is also directed to an apparatus for homogenizing the introduction of energy into goods which are to be cooked and which are cooked on at least one container such as a baking sheet, grate or the like in the cooking chamber of a cooking apparatus which employs the inventive method.

Traditionally, goods are cooked while on a baking sheet, a grate or the like in a cooking apparatus and it is particularly important that the design of the cooking apparatus provides a good thermal conduction in order to obtain an optimally uniform introduction of energy and, thus, an optimally uniform cooking of the goods to be cooked. However, even the most optimum thermal conduction of the baking sheet, grate or the like cannot in and of itself lead to a uniform cooking. A uniform introduction of energy in fact occurs when the cooking is also supported by circulating hot air and/or circulating steam, whereby the corresponding circulation is forced via a blower. The forced circulation according to the Prior Art leads more or less to a flow with a horizontal parabolic course over the baking sheets, grates or the like as well as, additionally, to a considerable vertical flow part.

DE 27 09 068 A1 discloses a method and an apparatus in which a blower arrangement composed of two cross-flow blowers is utilized. Two cross-flow blowers, however, require a complicated structure and can still not assure a satisfactory homogenization of the energy introduction.

SUMMARY OF THE INVENTION

An object of the present invention is to develop a method as well as an apparatus for homogenization of the introduction of energy into the goods which are to be cooked so that the disadvantages of the Prior Art are overcome.

The object relating to the method is inventively achieved in that the circulation of the cooking chamber atmosphere is forced by a Roots pump or blower that is preferably driven by a motor.

It is thereby preferred that the flows along the flow paths proceed over the container with essentially identical pressure gradients.

It is also inventively proposed that the flow velocity is set, particularly regulated, specifically for the goods to be cooked but independently of the batch.

It can also be inventively provided that the flows along the flow paths are kept at essentially the same temperature at the entry ports into the region of the container.

It is thereby inventively preferred that a plurality of containers are arranged above one another in the cooking chamber and essentially the same flow paths of the cooking chamber atmosphere are forced relative to each container.

That part of the object relating to the apparatus is achieved by at least one Roots pump or blower for guiding the cooking chamber atmosphere in one of two opposite blowing directions in alternation and a plurality of guide devices such as baffles, throttles or the like for homogenizing the pressure of the flows over the container as well as for guiding the flows along a plurality of flow paths proceeding essentially parallel to one another over the container, particularly over the narrow side of the container.

It can be provided that the Roots blower is controllable, preferably with infinite variation.

It is also inventively proposed that the guide means are arranged, preferably uniformly, along two long sides of the container that lie opposite one another.

It can also be provided that the guide means can be controlled, preferably with infinite variation.

The guide means can comprise nozzles.

It is also provided that a heater means for regulating the temperature of the flows at the discharge end of the guide means is adjustable, preferably with infinite variation.

One inventive embodiment is characterized in that a plurality of containers can be introduced into the cooking chamber, particularly via a rack frame or a rack frame carriage, that the same plurality of guide means is allocated to each container, and that the blower or, respectively, blowers works or, respectively, work in the same relative arrangement with respect to each of the containers.

The invention is thus based on the surprising perception that the cooking chamber atmosphere can be set and is preferably capable of infinite variation, which is specifically related to the goods to be cooked and independently of the batch. This is achieved by essentially avoiding a flow proceeding vertically to the propagation direction of the container or, respectively, containers for the goods to be cooked, and reducing the essentially horizontal traditional flow paths over the container or, respectively, containers for the goods to be cooked in this direction and namely by alternately forcing parallel flows in opposite directions by employment of a Roots blower or pump and guide means.

It is also inventively preferred that temperature, turbulence, direction and velocity of the flows over the container or, respectively, containers for the goods to be cooked is homogenized along the forced flow paths, at least immediately after passing the guide means.

Further features and advantages of the invention derive from the following description wherein an exemplary embodiment of the invention is explained in detail.

BRIEF DESCRIPTION OF THE DRAWING

The FIGURE is a schematic horizontal cross-sectional view through a cooking chamber with an inventive device.

DESCRIPTION OF THE PREFERRED EMBODIMENT

As can be derived from the FIGURE, an inventive apparatus for cooking goods to be cooked on a baking sheet 1 in a cooking chamber comprises a Roots blower or pump with two rotors 2, 2' as well as a plurality of baffles 3, 3'. The baking sheet 1 can be horizontally arranged via a rack frame carriage (not shown) in the cooking chamber 4 and can be uniformly in communication with the baffles 3, 3' which are positioned at two long sides of the sheet or container 1. The baffles 3, 3' see to it that the cooking chamber atmosphere of hot air and/or steam, which is circulated via the rotors 2, 2', proceeds in parallel flows horizontally over the baking sheet 1 along the flow paths 5 perpendicular to the longitudinal axis of the baking sheet 1 from respectively one baffle 3 to the corresponding baffle 3' lying opposite thereto. Moreover, the two rotors 2, 2' also enable the blowing direction to be turned by 180° in a defined rhythm, as indicated with the arrows A and B. A homogenization of the flow thus occurs by minimizing the length of the flow paths 5 as well as changing between the two opposite blowing directions A, B, which leads to a uniform introduction of energy and, thus, cooking of goods to be cooked on the baking sheet 1.

Of course, a plurality of baking sheets 1 can be arranged under one another extending respectively horizontally in the rack frame carriage, being respectively in communication with baffles and chargeable with flow in two blowing directions by the rotors 2, 2'.

Both individually as well as in arbitrary combination, the features of the invention disclosed in the above specification, in the drawings asa well as in the claims can be critical for realizing the various embodiments of the invention.

I claim:

1. A method for homogenizing an introduction of energy onto goods which are being cooked on at least one container selected from a baking sheet and a grate, said method comprising the steps of placing the container in a cooking chamber of a cooking apparatus, creating a forced circulation of a cooking chamber atmosphere by a Roots blower, directing the force circulation of the cooking chamber atmosphere in a plurality of flow paths proceeding essentially parallel to one another over the container, and periodically reversing the direction of the flow paths.

2. A method according to claim 1, wherein the step of creating the forced circulation creates flow along the flow paths over the container with essentially identical pressure gradients.

3. A method according to claim 1, which includes regulating a flow velocity of the plurality of flow paths, specifically for the goods being cooked and independent of the batch.

4. A method according to claim 1, wherein the flows along the flow paths are kept essentially at the same temperature at the entry ports into the region of the container.

5. A method according to claim 1, which includes providing a plurality of containers being arranged one above the other in the cooking chamber and directing the flow paths of the cooking chamber atmosphere relative to each of the containers.

6. An apparatus for homogenizing an introduction of energy onto goods which are being cooked while on at least one container selected from a baking sheet and a grate, said apparatus including a cooking chamber having a cooking chamber atmosphere, a Roots blower for creating a pressure flow of the cooking chamber atmosphere in two alternate opposite blowing directions, a plurality of guide devices for guiding the pressure flow over the container along a plurality of parallel flow paths.

7. An apparatus according to claim 6, wherein an output of the Roots blower is infinitely variable.

8. An apparatus according to claim 6, wherein the guide devices are arranged preferably uniformly along two long sides of the container lying opposite one another.

9. An apparatus according to claim 6, wherein the guide devices are controlled with infinite variation.

10. An apparatus according to claim 6, wherein the guide devices comprise nozzles.

11. An apparatus according to claim 6, which includes heating means for regulating the temperature of the flow at the discharge end of the guide devices, said heating means being adjustable with infinite variation.

12. An apparatus according to claim 6, wherein a plurality of containers can be introduced into the cooking chamber via a rack frame, and the same guide devices are allocated to each container and the Roots pump working with the same relative arrangement with respect to each of the containers.

13. An apparatus according to claim 6, wherein the guide devices are baffles.

14. An apparatus according to claim 6, wherein the guide devices are throttles.

* * * * *